United States Patent
Huang et al.

(10) Patent No.: US 7,378,894 B1
(45) Date of Patent: May 27, 2008

(54) METHOD AND SYSTEM FOR CLOCK ROUTING AND COMPENSATION

(75) Inventors: Choupin B. Huang, San Jose, CA (US); Ramesh K. R. Velugoti, Karnataka (IN); Charles T. Ballou, Columbia, SC (US); Soren Sharifi, San Jose, CA (US); Drin-Guang W. Chen, Irmo, SC (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 11/647,757

(22) Filed: Dec. 29, 2006

(51) Int. Cl.
*G06F 1/04* (2006.01)
*H03K 3/013* (2006.01)

(52) U.S. Cl. .................................. 327/292; 327/296

(58) Field of Classification Search ............. 327/141, 327/144, 147, 291–297; 307/106, 108
See application file for complete search history.

(56) References Cited

U.S. PATENT DOCUMENTS

| 6,011,441 A * | 1/2000 | Ghoshal ................... 331/55 |
| 6,204,712 B1 * | 3/2001 | Camerlo .................. 327/292 |
| 6,628,158 B2 * | 9/2003 | Forbes .................... 327/292 |
| 2007/0006107 A1 * | 1/2007 | Huang et al. ................ 716/6 |

* cited by examiner

*Primary Examiner*—Rexford Barnie
*Assistant Examiner*—Jason M Crawford
(74) *Attorney, Agent, or Firm*—Buckley, Maschoff & Talwalkar LLC

(57) ABSTRACT

A method, apparatus, article of manufacture, and system, the method including, in some embodiments, providing a differential clock ganging structure to receive complementary differential clock signals, the differential clock ganging structure outputting clock ganging output signals, providing a source termination structure for each of the clock ganging output signals, and providing an inductance and capacitance compensation structure to receive an output of the source termination structure and to connect to a terminal interconnect for at least one of the clock ganging output signals.

20 Claims, 5 Drawing Sheets

METHOD AND SYSTEM FOR CLOCK ROUTING AND COMPENSATION

BACKGROUND

A reliability and stability of a device, system, platform, or operating environment may depend on the device, system, platform, or operating environment operating within design specifications. A number of devices, systems, platforms, and operating environments use reference voltages. Clock skew tolerances and input edge rates are becoming increasingly smaller as systems become more complex and faster.

A number of attempts have been proposed to compensate for reference differential clock skew. In particular, pin-to-pin output skew and/or driver induced skew have been addressed by shortening propagation delay differences between clock input-to-output paths inside of a circuit and IC package. However, such approaches are limited in effectiveness and potential gains by, for example, the need to modify the circuits and IC packages.

DETAILED DESCRIPTION

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

Figure 1:
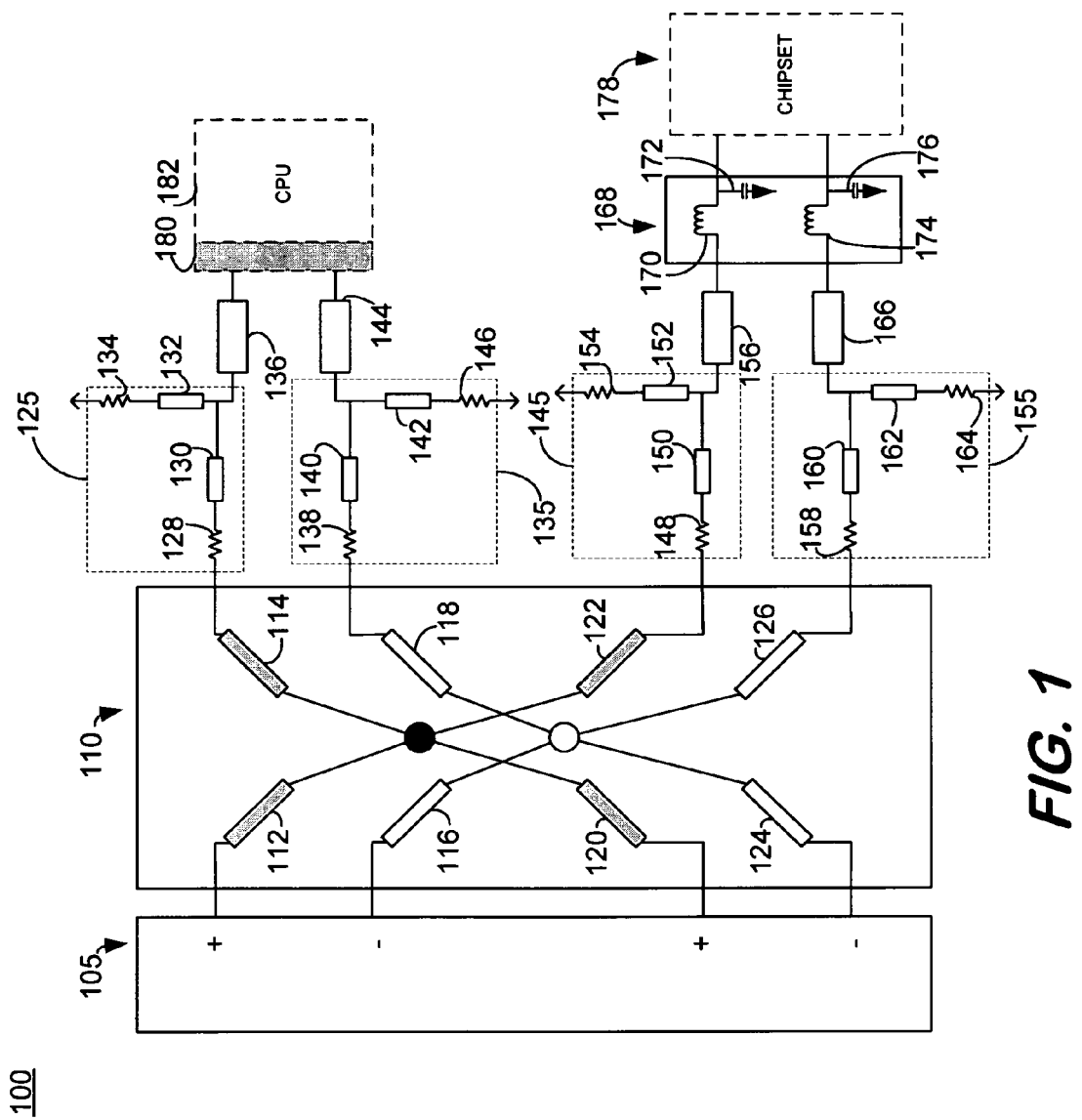
FIG. 1 is an exemplary depiction of a system apparatus, in accordance with some embodiments herein.

FIG. 1 is an exemplary depiction of a system 100 including an apparatus, in accordance with some embodiments herein. System 100 may include more, fewer, and alternate components and devices than those shown in FIG. 1. A clock driver device 105 provides complementary differential clock signals, as indicated by the (+) and (−) notations on the outputs of the clock driver device. Clock driver device 105 may be, for example, a host clock for a system bus and a reference clock for high speed differential links. The output voltages of clock driver device may vary.

The complimentary differential clock signals output by clock driver device 105 are received and conditioned by a differential clock ganging device 110. Differential clock ganging device 110 operates to reduce a pin-to-pin differential skew that may exist between the received differential clock signals. Like signals of the differential clock outputs are routed to a common junction point. For example, the input legs of the similar differential clock outputs (e.g., (+) CLKP) through inductors 112 and 120 are both routed to gang point 111 and input legs of the similar differential clock outputs (e.g., (−) CLKN) through inductors 116, and 124 are both routed to gang point 121. Output legs of clock ganging structure 110 originate at the gang points 111 and 121. The output legs or clock signal traces after gang points 111 and 121 are the same and are symmetrical in length. By having the same and symmetrical length, the output legs of clock ganging structure 110 may operationally reduce the pin-to-pin skew between the received differential clock signals. For example, a reference clock's pin-to-pin skew may be reduced to voltage ripples on the respective $V_{high}$ and $V_{low}$ signals of a clock driver device.

Source termination structures 125, 135, 145, and 155 are provided for the outputs of ganging structure 110 for each of the clock ganging output signals. Each of the source termination structures 125, 135, 145, and 155 includes a series resistance (e.g., 128, 138, 148, and 158) and a shunt resistance (e.g., 134, 146, 154, and 164). Also included are inductance components 130/132, 140/142, 150/152, and 160/162 for each of source termination structures 125, 135, 145, and 155, respectively. Source termination structures 125, 135, 145, and 155 operate to provide capacitance isolation and reflected noise reduction for various types of differential clocks, including, for example, high speed transceiver logic and high speed current control steering logic.

As shown in FIG. 1, a inductance and capacitance (LC) structure is provided at a terminal interconnect for one pair of the clock ganging output signals. In the example of FIG. 1, LC structure 168 includes inductor elements 170, 174 and capacitor elements 172, 176.

Also illustrated in FIG. 1 is an exemplary component connected to a differential pair of the clock ganging output signals. In the particular example of FIG. 1, a socket 180 having received a CPU 182 is shown connected to a differential pair of the clock ganging output signals.

LC structure 168 operates to reduce a differential skew that may exist between components supplied by the clock ganging output signals such as, for example, chipset 178 and CPU 182. The differential skew at the terminal interconnects to components, for example chipset 178 and CPU 182, may effectively compensate an edge rate and differential skew due to mismatched interconnect characteristics and a capacitive difference the clock paths connecting the components.

Figure 2:
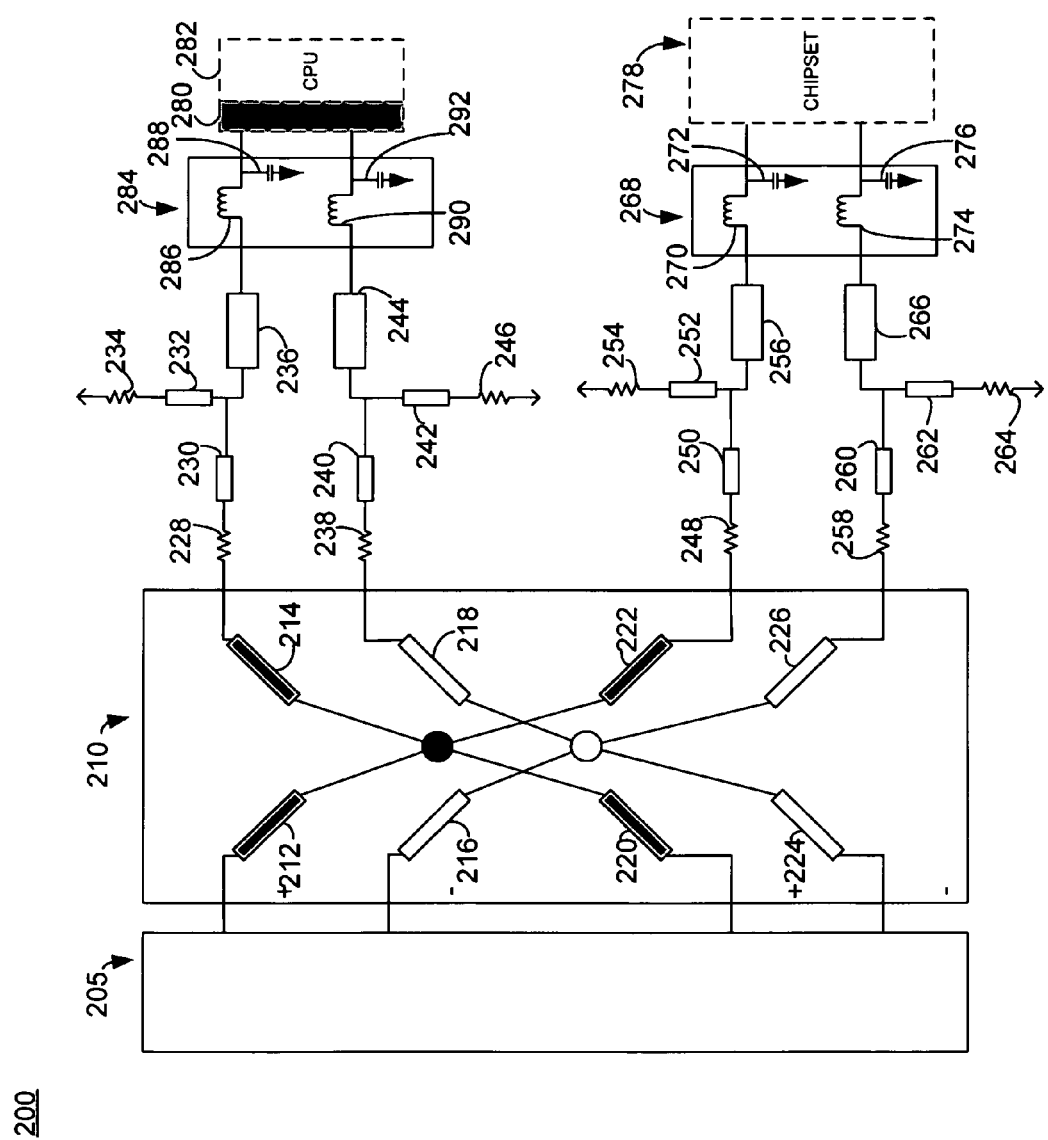
FIG. 2 is an exemplary depiction of a system, in accordance with some embodiments herein.

FIG. 2 is an exemplary depiction of a system 200 including an apparatus, in accordance with some embodiments herein. System 200 is similar in many respects to system 100. Therefore, a detailed discussion of the components of FIG. 2 repeated from FIG. 1 is not seen as necessary since a full understanding of such may be had by referring to FIG. 1.

Regarding FIG. 2, two LC compensation structures are included in contrast to FIG. 1. Compensation structure 284 is provided at a terminal interconnect for CPU 282 and compensation structure 268 is provided at a terminal interconnect to chipset 278. LC compensation structure 284 may be provided to compensate for a skew induced by a capacitance contributed by a socket 280.

In some embodiments, clock routing and compensation techniques of FIGS. 1 and 2 comprising a differential clock ganging structure, source termination, and LC compensation structure(s) may combine to effectively reduce output clock pin-to-pin skew, interconnect skew between components (e.g., a CPU and a chipset), and capacitive induced skew.

In some embodiments, the differential clock ganging structures herein are placed near a clock source and the source termination and LC compensation structures are located near interconnect components to effectively provide skew reduction.

Clock ganging structure 110 may provide a printed circuit board (PCB) methodology for reducing pin-to-pin skew of differential clock signals. In this manner, clock ganging structure 110 may be used to reduce pin-to-pin skew of differential clock signals without a need for or modification of input-to-output paths of integrated circuits (IC) and packages.

It should be appreciated that although only two complimentary differential clock signals are shown in FIGS. 1 and 2, more pairs of differential circuits may be compensated using the systems and methods disclosed herein.

Figure 3:
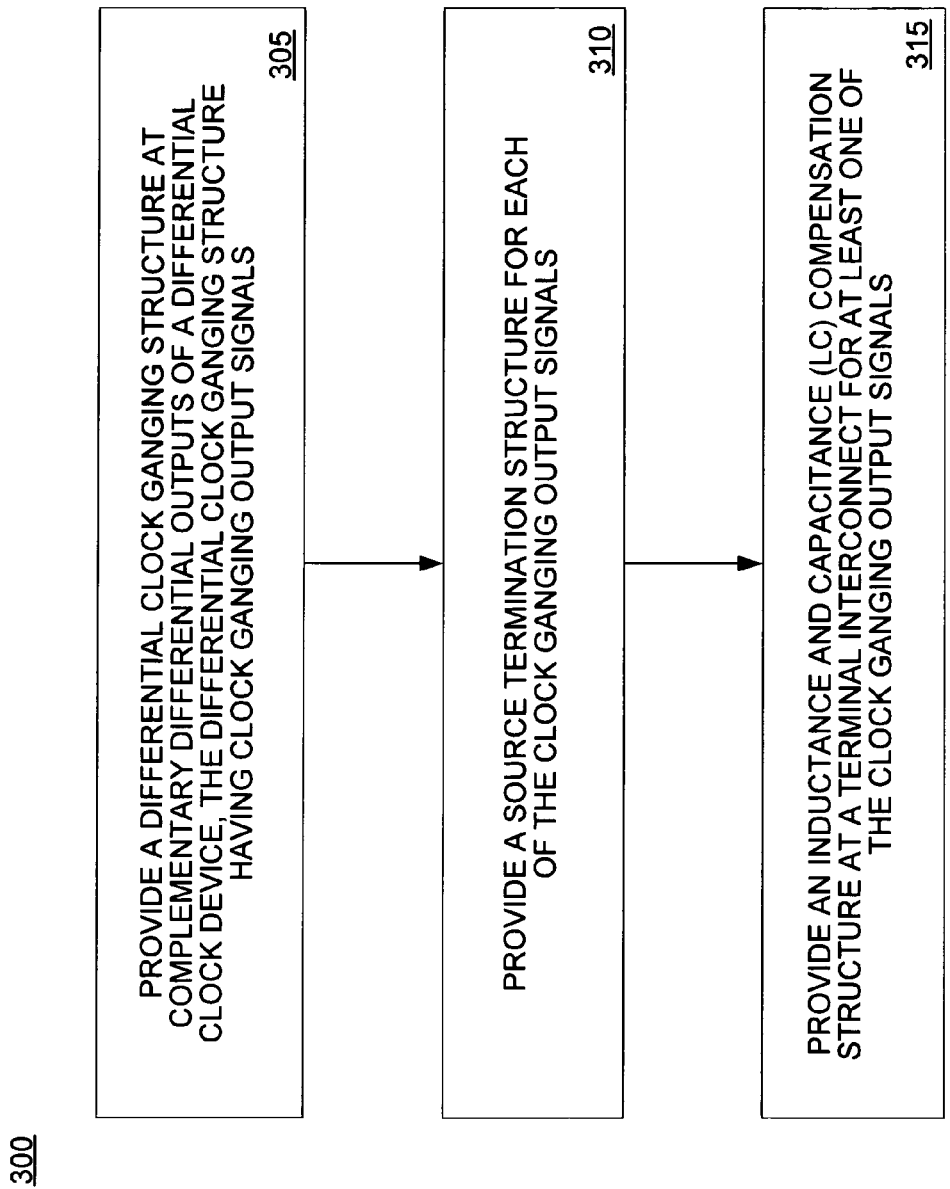
FIG. 3 is an exemplary flow diagram of a process, in accordance with some embodiments herein.

FIG. 3 is an exemplary flow diagram of a process 300, in accordance with some embodiments herein. At operation 305, a differential clock ganging structure is provided at complementary differential outputs of a differential clock device. The differential clock ganging structure provides clock ganging output signals. The differential clock ganging structure operates to reduce a pin-to-pin skew between outputs of the differential clock device.

At operation 310, a source termination structure is provided for each of the clock ganging output signals of the clock ganging structure. The source termination structures operate to provide capacitance isolation and reflected noise reduction for the clock ganging output signals.

At operation 315, an LC compensation structure is provided at a terminal interconnect for at least one of the clock ganging output signals. In this manner, an interconnect skew induced by a mismatch between components connected to the system and apparatuses herein may be reduced.

Figure 4:
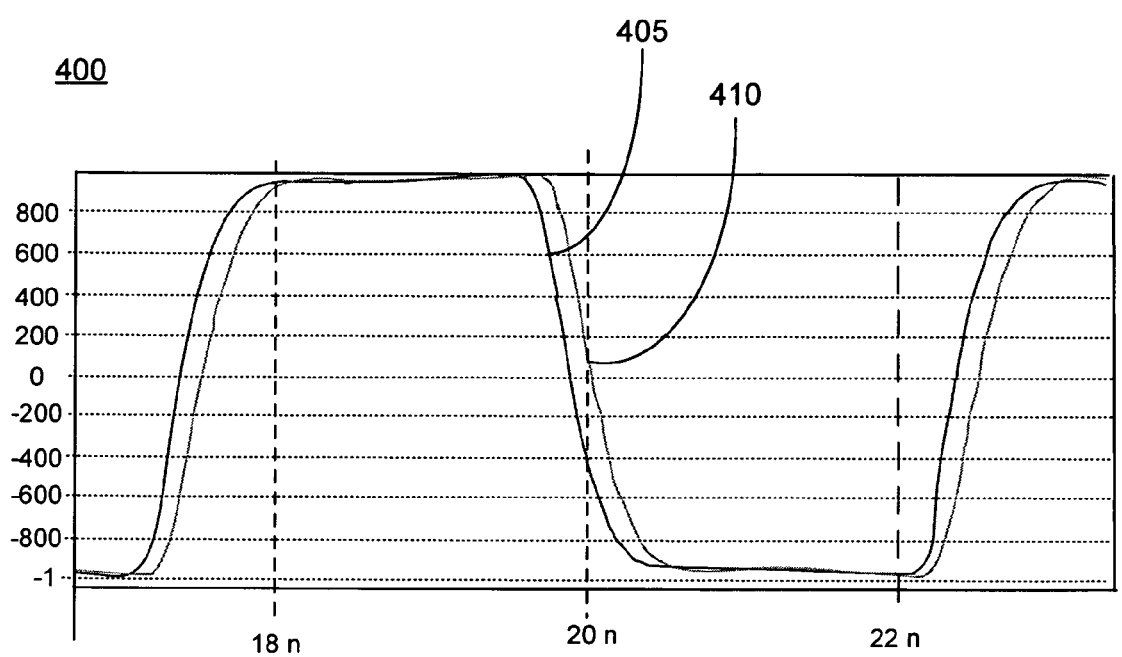
FIG. 4 is an exemplary graph.

FIG. 4 is an exemplary graph 400. Graph 400 provides an illustrative example of two differential clock signals output by a clock driver device at component interconnects. The skew between the differential clock signals is evidenced by the mismatch between graphed voltage 405 and graphed voltage 410.

Figure 5:
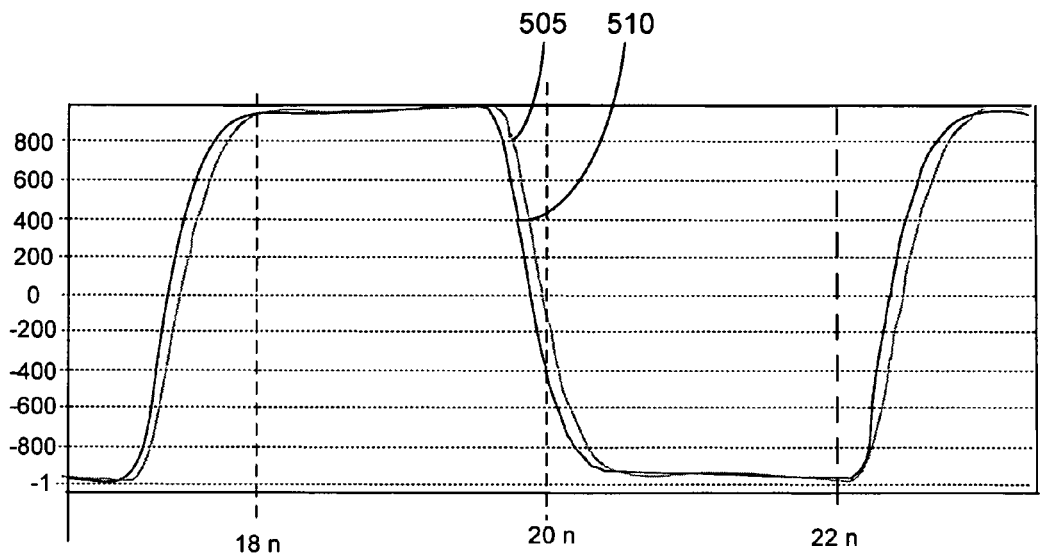
FIG. 5 is an exemplary graph, in accordance with some embodiments herein.

FIG. 5 is an exemplary graph 500. Graph 500 provides an illustrative example of two differential clock signals at component interconnects that have been conditioned by a differential clock ganging structure such, in accordance with the disclosures herein. Compared to voltage graphs 405 and 410, there is a reduction in the difference between voltage graphs 505 and 510.

Figure 6:
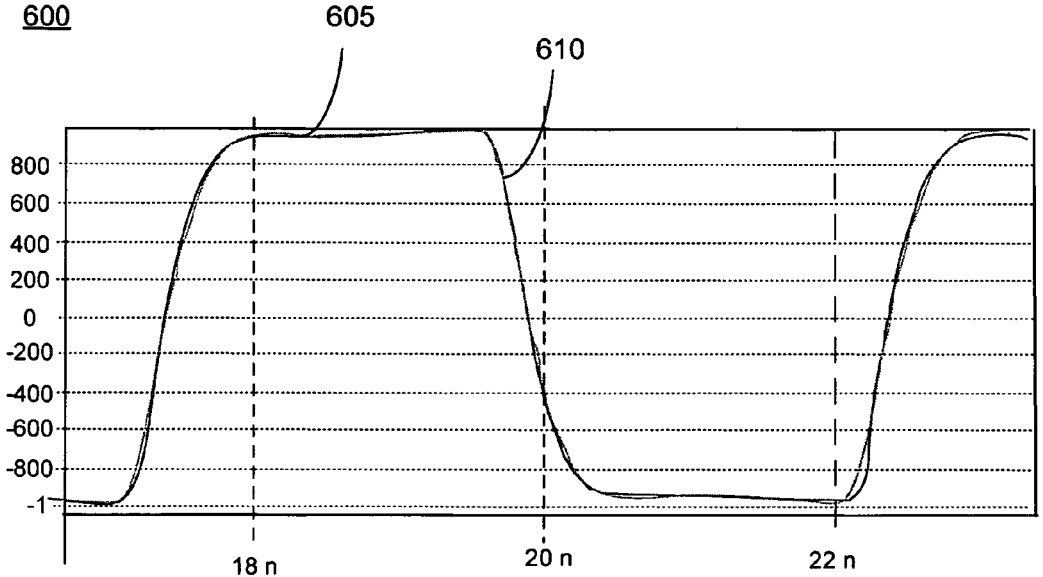
FIG. 6 is an exemplary graph, according to some embodiments herein.

FIG. 6 is an exemplary graph 600. Graph 600 provides an illustrative example of two differential clock signals at component interconnects that have been conditioned by a differential clock ganging structure and LC compensation structures, in accordance with the disclosures herein. Compared to voltage graphs 405, 410 and 505, 510 there is a significant reduction in the difference between voltage graphs 605 and 610. The reduction is such that voltage graphs 605 and 610 substantially coincide with each other. That is, the skew between the differential clocks signals is effectively reduced or eliminated.

It should be appreciated that the drawings herein are illustrative of various aspects of the embodiments herein, not exhaustive of the present disclosure.

What is claimed is:

1. A method comprising:
   providing a differential clock ganging structure to receive complementary differential clock signals, the differential clock ganging structure outputting clock ganging output signals;
   providing a source termination structure for each of the clock ganging output signals; and
   providing an inductance and capacitance (LC) compensation structure to receive an output of the source termination structure and to connect to a terminal interconnect for at least one of the clock ganging output signals.

2. The method of claim 1, wherein the differential clock ganging structure is provided to reduce a pin-to-pin skew between the complementary outputs of the differential clock device.

3. The method of claim 2, wherein the clock ganging output signals comprise the complementary differential clock output signals having the reduced pin-to-pin skew.

4. The method of claim 1, wherein output paths for the differential clock ganging structure have the same and symmetrical length for the complimentary outputs of the complementary differential clock output signals.

5. The method of claim 1, wherein each output path of the differential clock ganging structure has a common junction interconnecting like paths for each of the complementary differential clock output signals.

6. The method of claim 1, wherein the LC compensation structure at the terminal interconnect for at least one of the clock ganging output signals is provided to compensate for an edge rate and differential skew.

7. The method of claim 1, wherein the source termination structure provides capacitance isolation and reflected noise reduction.

8. An apparatus comprising:
   a differential clock ganging structure to receive complementary differential clock signals and to output clock ganging output signals;
   a source termination structure connected to each of the clock ganging output signals; and
   an inductance and capacitance (LC) compensation structure connected to a terminal interconnect for at least one of the clock ganging output signals.

9. The apparatus of claim 8, wherein the differential clock ganging structure is provided to reduce a pin-to-pin skew between the complementary differential clock signals.

10. The apparatus of claim 9, wherein the clock ganging output signals comprise the complementary differential clock signals having the reduced pin-to-pin skew.

11. The apparatus of claim 8, wherein output paths for the differential clock ganging structure have the same and symmetrical length for the received complementary differential clock signals.

12. The apparatus of claim 8, wherein each output path of the differential clock ganging structure has a common junction interconnecting like paths for each of the received complementary differential clock signals.

13. The apparatus of claim 8, wherein the LC compensation structure at the terminal interconnect for at least one of the clock ganging output signals is provided to compensate for an edge rate and differential skew.

14. The apparatus of claim 8, wherein the LC compensation structure comprises an inductance and capacitance circuitry.

15. The apparatus of claim 8, wherein the source termination structure comprises a series resistance and a shunt resistance.

16. The apparatus of claim 8, wherein the source termination structure provides capacitance isolation and reflected noise reduction.

17. A system comprising:
   a differential clock ganging structure to receive complementary differential clock signals and to output clock ganging output signals;
   a source termination structure connected to each of the clock ganging output signals;

an inductance and capacitance (LC) compensation structure connected to a terminal interconnect for at least one of the clock ganging output signals; and a processor connected to the LC compensation structure connected to the at least one of the clock ganging output signals.

18. The system of claim 17, wherein the differential clock ganging structure is provided to reduce a pin-to-pin skew between the complementary differential clock signals.

19. The system of claim 18, wherein the clock ganging output signals comprise the complementary outputs of the differential clock device having the reduced pin-to-pin skew.

20. The system of claim 17, wherein output paths for the differential clock ganging structure have the same and symmetrical length for the received complementary differential clock signals.

* * * * *